(12) United States Patent
Suganuma

(10) Patent No.: US 7,604,030 B2
(45) Date of Patent: Oct. 20, 2009

(54) PNEUMATIC TIRE WITH TREAD HAVING RIB SHAPED LAND SECTION, LUG GROOVES AND SIPES

(75) Inventor: Akira Suganuma, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 467 days.

(21) Appl. No.: 10/585,937

(22) PCT Filed: Dec. 21, 2004

(86) PCT No.: PCT/JP2004/019075

§ 371 (c)(1),
(2), (4) Date: Jul. 13, 2006

(87) PCT Pub. No.: WO2005/068226

PCT Pub. Date: Jul. 28, 2005

(65) Prior Publication Data

US 2007/0163693 A1   Jul. 19, 2007

(30) Foreign Application Priority Data

Jan. 13, 2004  (JP) .............................. 2004-005979

(51) Int. Cl.
*B60C 11/12* (2006.01)
(52) U.S. Cl. ............................ 152/209.18; 152/209.27; 152/DIG. 3
(58) Field of Classification Search ............ 152/209.18, 152/209.27, 209.28, 902, DIG. 3
See application file for complete search history.

(56) References Cited

U.S. PATENT DOCUMENTS 5,385,189 A * 1/1995 Aoki et al. ............. 152/DIG. 3

6,250,354 B1 * 6/2001 Kawai ................... 152/DIG. 3

FOREIGN PATENT DOCUMENTS

| EP | 1454768 | * | 9/2004 |
|---|---|---|---|
| JP | 03-178808 A | | 8/1991 |
| JP | 05-069706 A | | 3/1993 |
| JP | 06-055912 A | | 3/1994 |
| JP | 06-080002 A | | 3/1994 |
| JP | 08-048114 | * | 2/1996 |
| JP | 11-091315 | * | 4/1999 |
| JP | 2000-225815 | * | 8/2000 |
| JP | 2000-225815 A | | 8/2000 |
| JP | 2000-229505 A | | 8/2000 |
| JP | 2000-280713 A | | 10/2000 |
| JP | 2000-326707 A | | 11/2000 |
| JP | 2002-362114 A | | 12/2002 |

OTHER PUBLICATIONS

Japanese Office Action dated Mar. 10, 2009.

* cited by examiner

*Primary Examiner*—Steven D Maki
(74) *Attorney, Agent, or Firm*—Sughrue Mion, PLLC

(57) ABSTRACT

A pneumatic tire 10a including in a tread at least two circumferential major grooves 20a, 21a, 22a, and 23a extending in a tire circumferential direction and a rib-shaped land section formed, the pneumatic tire including: lug grooves 30a, 31a, 32a, and 33a extending in a tire width direction, each of which includes an end closed by the lib-shaped land section and the other end open to one of the circumferential major grooves (21a, 22a), the open ends being arranged in a staggered fashion in the tire circumferential direction; and first sipes which include a sipe 40a extending in the tire width direction and a sipe 41a extending in the tire circumferential direction and connect the lug grooves arranged in the staggered fashion.

4 Claims, 4 Drawing Sheets

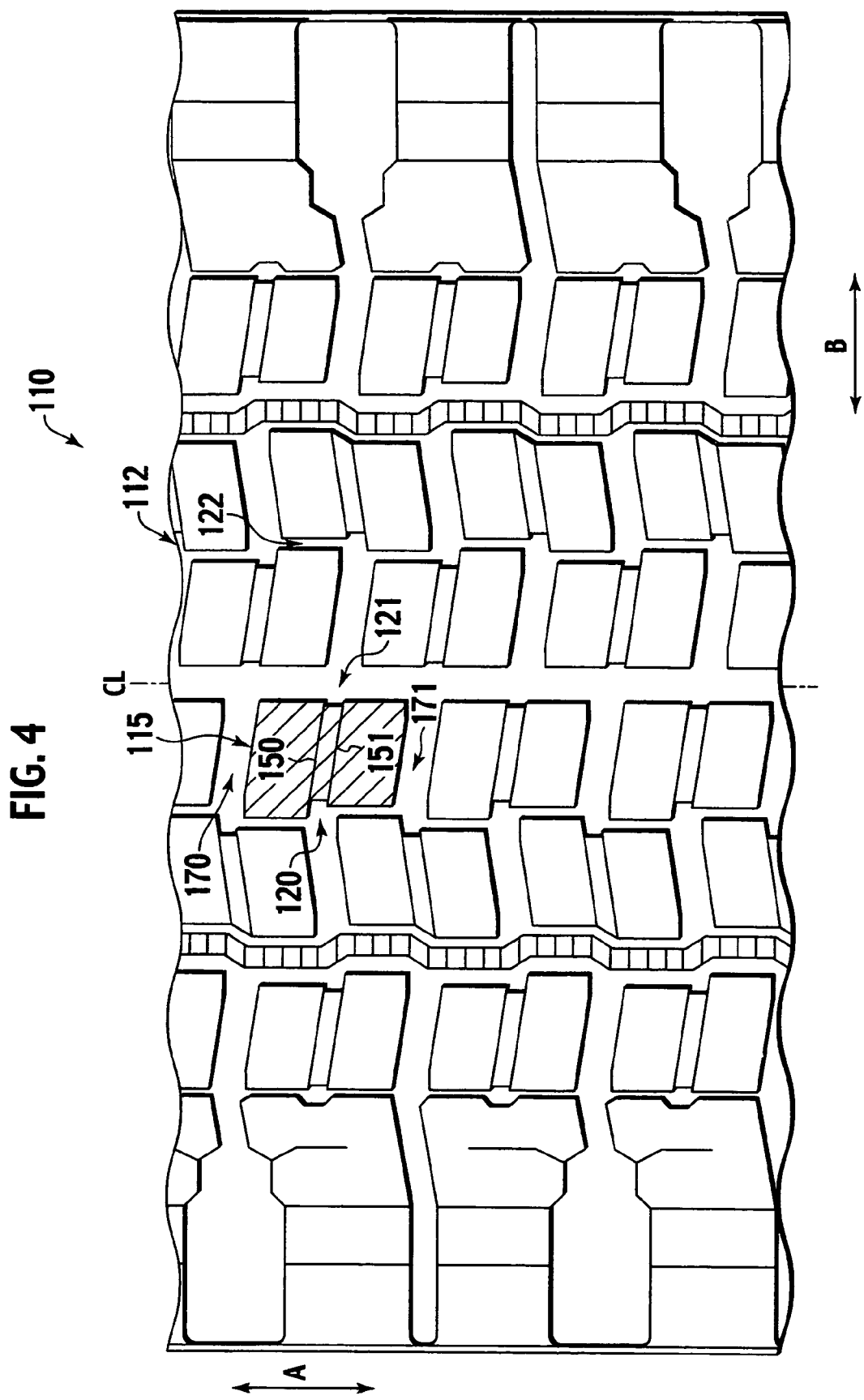

PNEUMATIC TIRE WITH TREAD HAVING RIB SHAPED LAND SECTION, LUG GROOVES AND SIPES

TECHNICAL FIELD

The present invention relates to a pneumatic tire including a tread pattern improving performance on snow and ice and wet performance.

BACKGROUND ART

Blocks of a conventional tread pattern are defined by circumferential major grooves extending in a tire circumferential direction and lug grooves extending in a tire width direction. Such a block pattern is excellent in driving and braking performance. Moreover, a sporty exterior image thereof has become popular in patterns for high performance cars. This pattern is used in snow tires, RV tires, and construction vehicle tires for use in snow and mud (for example, see Japanese Patent Laid-open publication No. 2002-362114).

To improve the performance on snow and ice of such tires, a method of increasing an edge effect by increasing the number of blocks or adding sipes is effective.

Depth of the sipes added to the blocks is usually not more than 60% of depth of the circumferential major grooves.

However, if the edge effect is simply increased, rigidity of the blocks decreases, and the blocks are more deformed, not resulting in an improvement in the performance on snow and ice. Moreover, the durability of the blocks and uneven wear are adversely affected.

In the light of the aforementioned problem, an object of the present invention is to provide a pneumatic tire with performance on snow and ice and wet performance improved by increasing the edge effect while maintaining block rigidity.

DISCLOSURE OF THE INVENTION

To achieve the aforementioned object, an aspect of the present invention is a pneumatic tire including in a tread at least two circumferential major grooves extending in a tire circumferential direction and a rib-shaped land section formed, the pneumatic tire including: lug grooves extending in a tire width direction, each of which includes an end closed by the lib-shaped land section and the other end open to one of the circumferential major grooves, the open ends being arranged in a staggered fashion in the tire circumferential direction; and first sipes which include a sipe extending in the tire width direction and a sipe extending in the tire circumferential direction and connect the lug grooves arranged in the staggered fashion.

In the pneumatic tire according to the present invention, a block is defined by the circumferential major grooves, lug grooves, and first sipes, so that the edge effect is increased while the rigidity of the block is maintained, thus improving the performance on snow and ice and wet performance.

In the above invention, desirably, at least one of the first sipes has a bent shape with at least a bend, and depth of the first sipes is 50% or more of depth of circumferential major grooves.

In the above invention, desirably, the block defined by the circumferential major grooves, lug grooves, and first sipes includes two second sipes extending in the tire width direction.

Moreover, desirably, an end of each of the second sipes is open to one of the circumferential major grooves, and the other end is open to one of the first sipes.

Furthermore, desirably, the second sipes are linear and have depth of 50% or more of the depth of the circumferential major grooves.

BRIEF DESCRIPTION OF THE DRAWINGS

FIG. 4 is a plan view of a tread of a pneumatic tire according to a comparative example.

BEST MODE OF CARRYING OUT THE INVENTION

Figure 1:
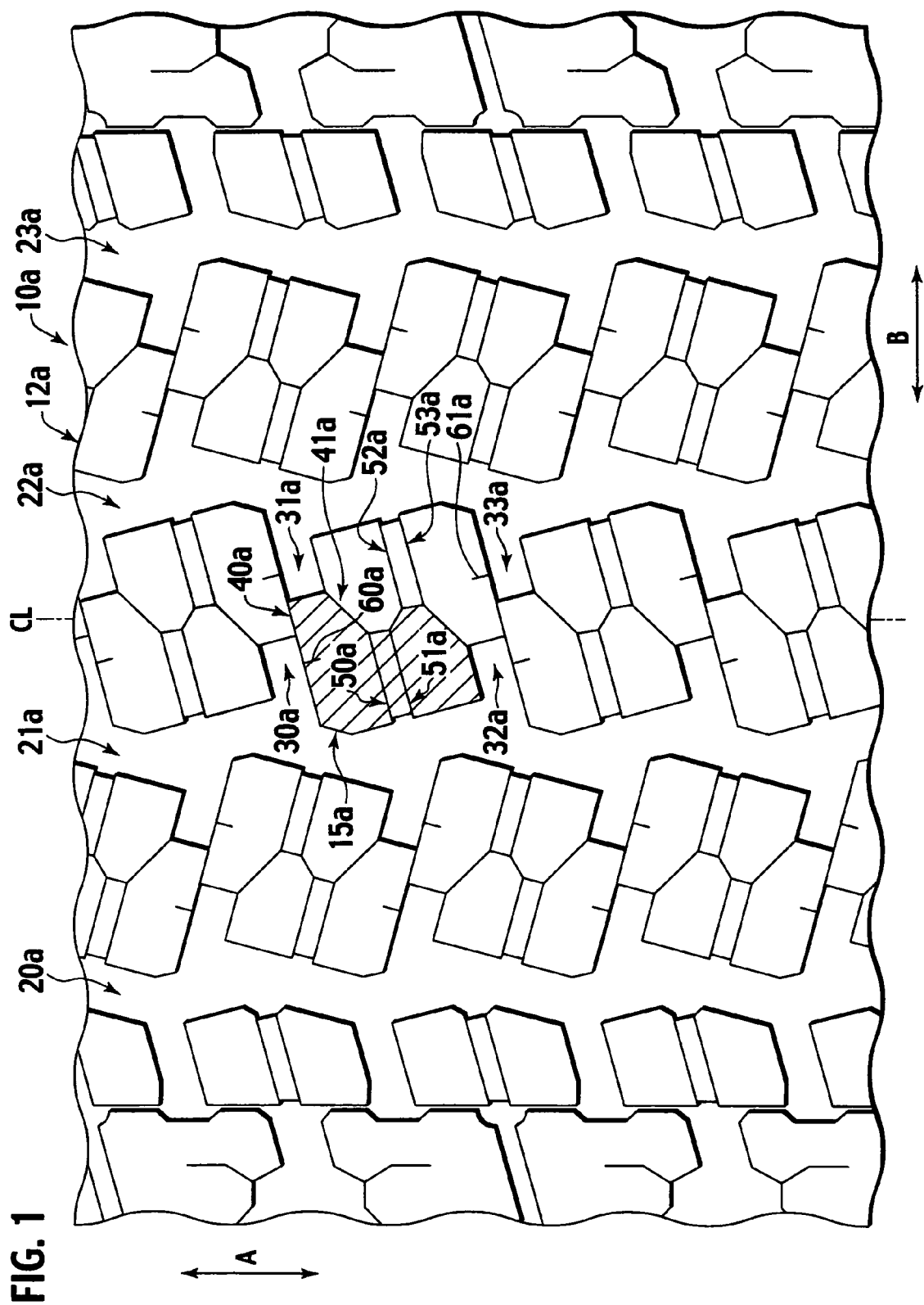
FIG. 1 is a plan view of a tread of a pneumatic tire according to an embodiment of the present invention (No. 1).

Next, with reference to the drawings, a description is given of an embodiment of the present invention. Same or similar parts are given same or similar reference numerals. However, the drawings are schematic, and noted that each dimensional proportion and the like are different from real ones. Accordingly, specific dimensions and the like should be determined with reference to the following description. Moreover, it is obvious that some parts in a drawing have different dimensional relationships or proportions from those in another drawing.

(Pneumatic Tire)

As shown in FIG. 1, a pneumatic tire 10a according to an embodiment of the present invention includes in a tread: circumferential major grooves 20a, 21a, 22a, and 23a extending in a tire circumferential direction (a direction indicated by an arrow A); rib-shaped land sections defined by the circumferential major grooves 20a, 21a, 22a, and 23a; lug grooves 30a, 31a, 32a, and 33a extending in a tire width direction (a direction indicated by an arrow B); and first sipes 40a and 41a connecting the lug grooves arranged in a staggered fashion. The number of the circumferential major grooves 20a, 21a, 22a, and 23a is four in FIG. 1 but may be any number more than one.

One end of each of the lug grooves 30a, 31a, 32a, and 33a is closed by one of the rib-shaped land sections. The other ends of the lug grooves 30a, 31a, 32a, and 33a are open to the circumferential major groove 20a or 21a. The open ends of the lug grooves 30a, 31a, 32a, and 33a are arranged in a staggered fashion in the tire circumferential direction.

The first sipes include a sipe 40a extending in the tire width direction and a sipe 41a extending in the tire circumferential direction. The sipe 40a connects the lug grooves 30a and 31a arranged in a staggered fashion while the sipe 41a connects the lug grooves 31a and 32a arranged in a staggered fashion.

To be specific, the sipe 40a connects one end of the lug groove 30a, the other end of which is open to the circumferential major groove 21a, and one end of the lug groove 31a, the other end of which is open to the circumferential major groove 22a. The sipe 41a connects one end of the lug groove 31a, the other end of which is open to the circumferential major groove 22a, and one end of the lug groove 32a, the other end of which is opened to the circumferential major groove 21a.

Moreover, at least one of the first sipes 40a and 41a has a bent shape including at least one bend (in FIG. 1, the sipe 41a is zigzag). Furthermore, the first sipes 40a and 41a (the sipe 41a in FIG. 1) are in contact with one end of each of later-described second sipes 50a, 51a, 52a, and 53a.

Depth of the first sipes 40a and 41a is 50% or more of that of the circumferential major grooves 20a, 21a, 22a, and 23a. Width of the first sipes 40a and 41a is about 2 mm.

In the pneumatic tire according to the embodiment, for example, a block (a shaded area of FIG. 1) is defined by the circumferential major groove 21a, lug grooves 30a and 32a, and first sipes 40a and 41a.

The block includes the two sipes 50a and 51a extending in the tire width direction. The second sipes 50a and 51a are sipes open at both ends. One end of each of the second sipes 50a and 51a is open to the circumferential major groove 21a while the other end thereof is open to the first sipes 40a and 41a. The second sipes 50a and 51a are linear, and depth of the same is 50% or more of that of the circumferential major grooves 20a, 21a, 22a, and 23a.

The block further includes third sipes 60a and 61a extending in the tire circumferential direction. The third sipes 60a and 61a, each of which is a sipe open at one end, are open to only the lug grooves 30a and 33a, respectively.

(Modification)

Figure 2:
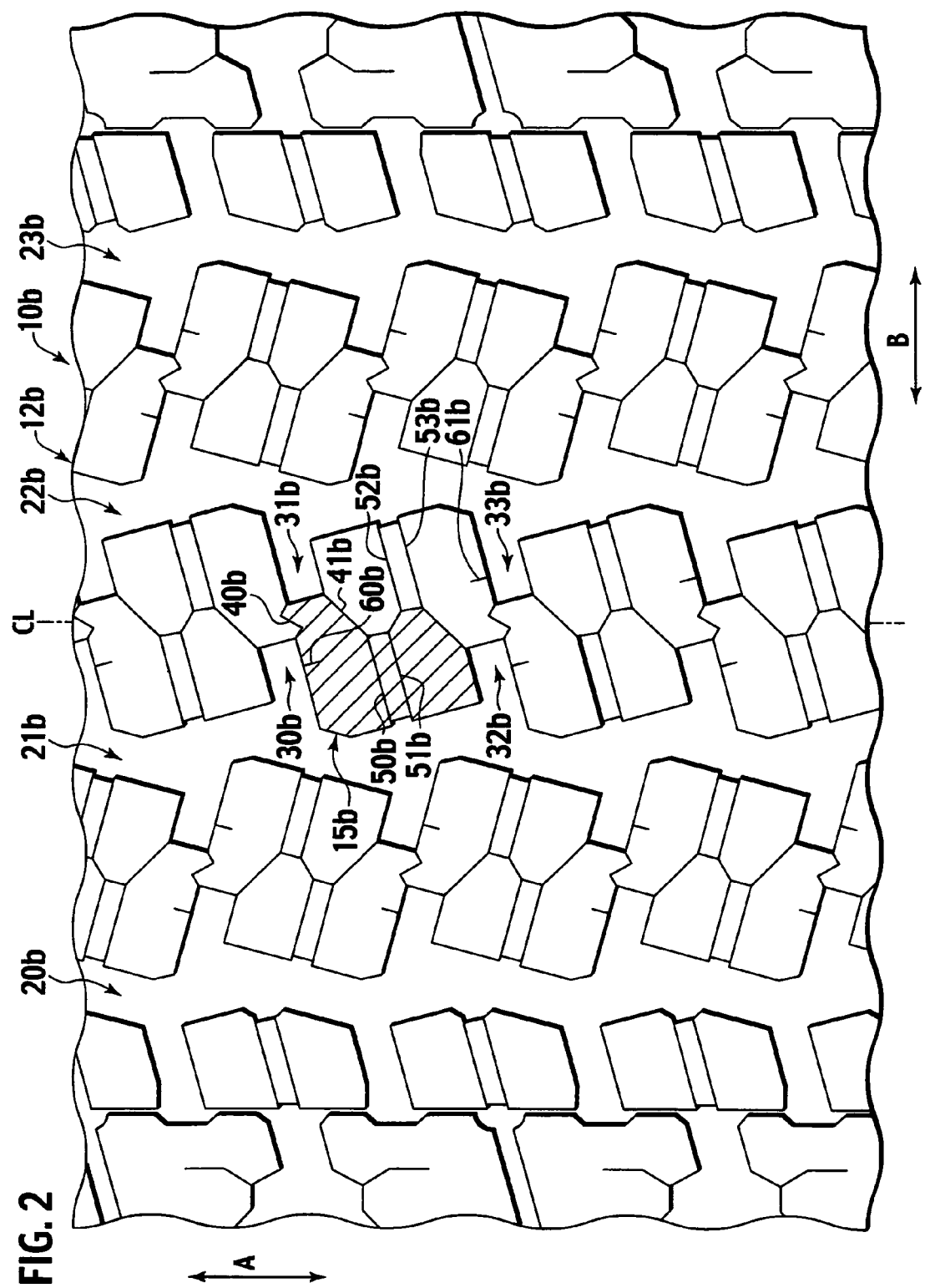
FIG. 2 is a plan view of a tread of the pneumatic tire according to the embodiment of the present invention (No. 2).
Figure 3:
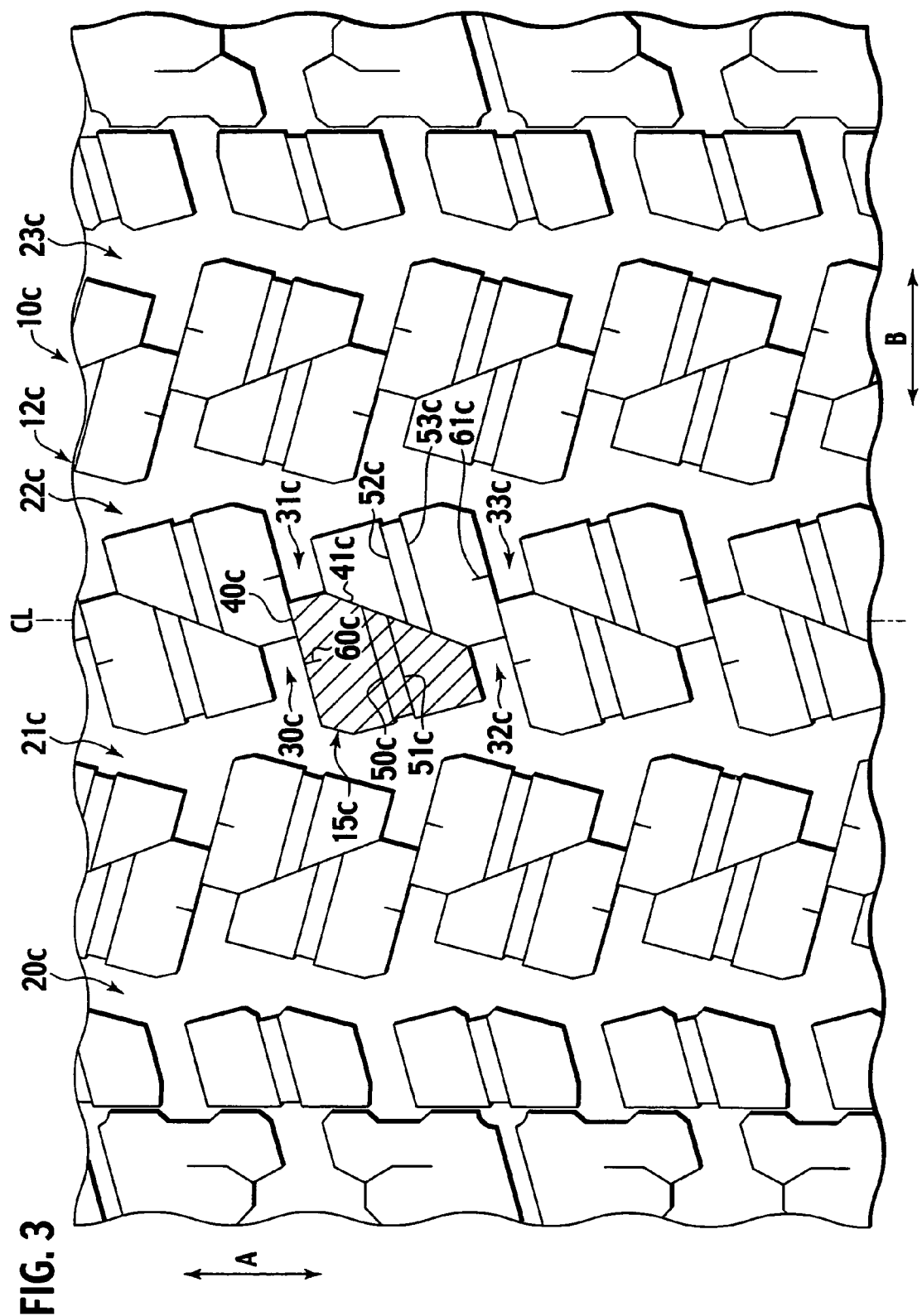
FIG. 3 is a plan view of a tread of the pneumatic tire according to the embodiment of the present invention (No. 3).

The pneumatic tire according to this embodiment may include a tread pattern shown in FIG. 2 or 3 other than the tread pattern shown in FIG. 1.

FIG. 2 shows a pneumatic tire including in a tread: circumferential major grooves 20b, 21b, 22b, and 23b extending in the tire circumferential direction (a direction indicated by an arrow A); lug grooves 30b, 31b, 32b, and 33b extending in the tire width direction (a direction indicated by an arrow B); and first sipes 40b and 41b connecting the lug grooves arranged in a staggered fashion. In the pneumatic tire shown in FIG. 2, a block (a shaded area of FIG. 2) is defined by the circumferential major groove 21b, lug grooves 30b and 32b, and first sipes 40b and 41b.

At least one of the first sipes 40b and 41b has a bent shape including at least one bend. Only the sipe 41a zigzags in FIG. 1 while the sipes 40b and 41b of FIG. 2 both zigzag. The other shape, depth and width of the sipes, and the like are the same as those of FIG. 1, and the description thereof is omitted.

Next, FIG. 3 shows a pneumatic tire including in a tread: circumferential major grooves 20c, 21c, 22c, and 23c extending in the tire circumferential direction (a direction indicated by an arrow A); lug grooves 30c, 31c, 32c, and 33c extending in the tire width direction (a direction indicated by an arrow B); and first sipes 40c and 41c connecting the lug grooves arranged in a staggered fashion. In the pneumatic tire shown in FIG. 3, a block (a shaded area of FIG. 3) is defined by the circumferential major groove 21c, lug grooves 30c and 32c, and first sipes 40c and 41c.

The sipe 41c of FIG. 3, unlike the sipes in FIGS. 1 and 2, linearly connects the lug grooves 31c and 32c. The other shape, depth and width of the grooves and the like are the same as those of FIG. 1, and the description thereof is omitted.

(Operation and Effect)

The pneumatic tire 10a according to the embodiment includes in the tread the circumferential major grooves 21a and 22a, lug grooves 30a, 31a, and 32a extending in the tire width direction, and the first sipes 40a and 41a. One end of each of the lug grooves 30a, 31a, and 32a is closed by the rib-shaped land section. The other ends thereof are open to the circumferential major grooves, and the open ends are arranged in the staggered fashion in the tire circumferential direction. The first sipes 40a and 41a connect the lug grooves arranged in the staggered fashion.

A sipe absorbs meltwater, which causes a water film to be formed between a road surface and the tire, and removes the water film, thus improving the wet performance. Moreover, the sipe cuts the water film on the road surface with edge part to surely bring the tire into contact with the road surface, thus improving traction performance and running stability on snow. In the pneumatic tire according to the embodiment, the block is defined by the circumferential major grooves, lug grooves, and first sipes. Accordingly, the edge effect increases while the block rigidity is maintained, thus improving the performance on snow and ice and wet performance. Moreover, in the pneumatic tire according to this embodiment, it is possible to improve especially the performance on snow and ice up to the medium stage of wear and the wet performance in the medium and final stages of wear.

Desirably, at least one of the first sipes 40a and 41a has a bent shape with at least one bend, and the depth thereof is 50% or more of that of the circumferential major grooves 21a and 22a. Moreover, it is desirable that the first sipes 40a and 41a have zigzag bent shapes since the first 40a and 41a connect the lug grooves 30a, 31a, and 32a. Furthermore, the depth of the first sipes 40a and 41a set to 50% or more of that of the circumferential major grooves 21a and 22a can further prevent formation of a water film and increase the edge effect.

Desirably, the block defined by the circumferential major grooves 21a and 22a, lug grooves 30a, 31a, and 32a, and first sipes 40a and 41a further includes the two second sipes 50a and 51a extending in the tire width direction. The provision of the second sipes 50a and 51a can further prevent formation of the water film and increase the edge effect.

Moreover, desirably, one end of each of the second sipes 50a and 51a is open to the circumferential major groove 21a while the other end thereof is open to the first sipe 41a. Since the second sipes 50a and 51a are sipes open at both ends, the edge effect is further increased, and the traction performance is improved.

Desirably, the second sipes 50a and 51a are linear and have depth of 50% or more of that of the circumferential major groove 21a. The second sipes 50a and 51a are desirably linear since the second sipes 50a and 51a are open to the circumferential major groove 21a and first sipe 41a. Moreover, the depth of the second sipes 50a and 51a set to 50% or more of that of the circumferential major groove 21a can further prevent formation of the water film and increase the edge effect.

Moreover, the width of the first sipes 40a and 41a (especially sipe 40a) is increased to about 2 mm while width of a usual sipe is about 0.4 to 0.7 mm, which can improve the wet performance.

EXAMPLE

Example of the pneumatic tire according to the embodiment of the present invention is described in detail below. In order to confirm the effects of the present invention, one type of tires of Example to which the present invention was applied and one type of tires of Comparative Example were attached to an actual vehicle (2-D4 vehicle) and subjected to a wet turning test and a braking test on ice to evaluate the wet performance and performance on snow and ice.

For both Example and Comparative Example, tire rims were set to 7.50×22.5; inflation pressure, 900 kPa; and load, normal load (which is a load corresponding to the maximum load capacity for a single wheel in the Year Book 2003 of JATMA (the Japan Automobile Tire Manufacturers Association)). The tire size was 11R22.5.

The tread pattern of Example was set to a shape shown in FIG. 1 described in the embodiment. The depth of the first and second sipes is 75% of that of the circumferential major grooves.

On the other hand, as shown in FIG. 4, the tread pattern of the tires of Comparative Examples was a pattern including a block (a shaded area of FIG. 4) defined by circumferential major grooves 120, 121, and 122 extending in the tire circumferential direction (a direction indicated by an arrow A); and lug grooves 170 and 171 extending in the tire width direction (a direction indicated by an arrow B). On the block 115, both-end open sipes 150 and 151 open to the circumferential major grooves were formed. Depth of the sipes of Comparative Example was 55% of that of the circumferential major grooves.

In the wet turning test, turning acceleration was measured on a concrete road with that of the tires of Comparative Example when the tires were new being set to 100. The turning acceleration was obtained by measuring time required for the vehicle to run a circular road at a constant speed and calculating acceleration toward the center of the circle. The turning acceleration is expressed by a squared reciprocal of the required time. A larger turning acceleration indicates better wet performance. The water depth in the wet turning test was 3 mm.

In the braking test on ice, an index of deceleration was measured with that of the tires of Comparative Example when the tires were new being set to 100. The index of deceleration is expressed by a reciprocal of time required for the vehicle to stop after full braking applied while the vehicle was moving at 20 km per hour. A larger index of deceleration indicates better performance on snow and ice.

(Results)

Results of the wet turning test are shown in Table 1.

TABLE 1

|  | Comparative Example | Example |
| --- | --- | --- |
| New | 100 | 115 |
| 60% worn | 70 | 95 |

Comparison of Comparative Example with Example revealed that the turning acceleration of Example was larger than that of Comparative Example when the tires were new and 60% worn. This revealed that the tires including the block pattern defined by the circumferential major grooves, lug grooves, and first sipes had improved wet performance.

Results of the braking test on ice are shown in Table 2.

TABLE 2

|  | Comparative Example | Example |
| --- | --- | --- |
| New | 100 | 110 |

Comparison of Comparative Example with Example revealed that the index of deceleration of Example was larger than that of Comparative Example when the tires were new. This revealed that the tires including the block pattern defined by the circumferential major grooves, lug grooves, and first sipes had improved performance on snow and ice.

INDUSTRIAL APPLICABILITY

As described above, the pneumatic tire according to the present invention includes improved performance on snow and ice and wet performance and can be therefore suitably used as a vehicle tire.

I claim:

1. A pneumatic tire (10a) including in a tread at least two circumferential major grooves (21a, 22a) extending in a tire circumferential direction and a rib-shaped land section continuously extended in the tire circumferential direction via a sipe (40a) that extends in a tire width direction, the pneumatic tire comprising:

lug grooves (30a, 31a, 30a) extending in the tire width direction, each of which includes an end closed by the rib-shaped land section and the other end open to one of the at least two circumferential major grooves (21a, 22a), the open ends being arranged in the staggered fashion in the tire circumferential direction; and first sipes (40a, 41a) which include the sipe (40a) extending in the tire width direction and another sipe (41a) extending in the tire circumferential direction, and connect the lug grooves (30a, 31a, 30a) arranged in the staggered fashion; wherein a block is defined by the one of the at least two circumferential major grooves (21a, 22a), the lug grooves (30a, 31a, 32a), and the first sipes (40a, 41a), the block includes two second sipes (50a, 51a), the two second sipes (50a, 51a) are extended in the tire width direction, one end thereof respectively open to one of the at least two circumferential major grooves (21a, 22a), and the other end thereof respectively open to the first sipes (40a, 41a), the second sipes (50a, 51a) divide the block into two wide sections being wide in the tire circumferential direction and a narrow section being narrower than the two wide sections in the tire circumferential direction, the narrow section is arranged between the two wide sections, the lug grooves (30a, 31a, 30a) include a first lug groove (30a), a second lug groove (31a) and a third lug groove (32a), and the sipe (40a) extending in the tire width direction connects the first lug groove (30a) and the second lug groove (31a) arranged in the staggered fashion, and the other sipe (41a) extending in the tire circumferential direction connects the second lug groove (31a) and the third lug groove (32a) arranged in the staggered fashion.

2. The pneumatic tire according to claim 1, wherein at least one of the first sipes (40a, 41a) has a bent shape and at least a bend and a depth of the first sipes is 50% or more of a depth of the circumferential major grooves (21a, 22a).

3. The pneumatic tire according to claim 1, wherein the second sipes (50a, 51a) are linear and have a depth of 50% or more of a depth of the circumferential major grooves (21a, 22a).

4. The pneumatic tire according to claim 1, further comprising third sipes, wherein one of the third sipes is open only on one end, the one end being open to the first lug groove.

* * * * *